(No Model.)
J. WALKER.
TOOL HOLDER.
No. 336,362. Patented Feb. 16, 1886.
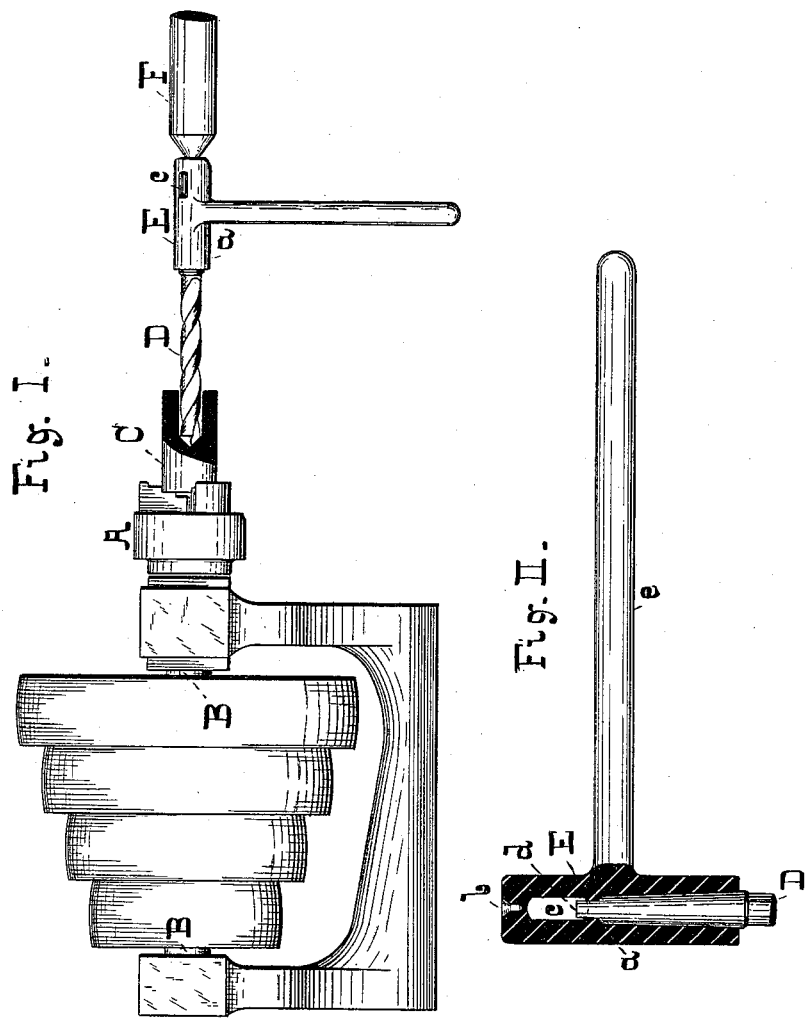
WITNESSES
Danl Fisher
Chas B Cassady
INVENTOR
John Walker,
by G. H. & W. T. Howard,
Attys.

UNITED STATES PATENT OFFICE.

JOHN WALKER, OF CLEVELAND, OHIO.

TOOL-HOLDER.

SPECIFICATION forming part of Letters Patent No. 336,362, dated February 16, 1886.

Application filed September 21, 1885. Serial No. 177,773. (No model.)

*To all whom it may concern:*

Be it known that I, JOHN WALKER, of Cleveland, in the county of Cuyahoga and State of Ohio, have invented certain Improvements in Tool-Holders, of which the following is a specification.

To fully understand the nature of my invention it must be known that it is often found necessary in machine-shop practice to bore articles held in a lathe-chuck with drills, which are fed with the non-rotative center of the lathe, and, to admit of this manner of feeding, twist-drills and reamers are generally provided with conical depressions at the butt-end adapted to receive the center-point.

When drills and other similar tools are used as above briefly described, they are held so as to not be turned or revolved by the action of the chuck by means of what are generally termed "dogs" and "clamps," the ends of which strike against the lathe-bed. All these devices are liable to injure the tool, and with them no correct idea can be had as to the strain on the tool, and it is often broken by being fed in too rapidly.

My tool-holder is designed to obviate the difficulties above mentioned, as will hereinafter fully appear.

In the drawings forming a part hereof, Figure I is a side view of certain parts of a lathe, and a chuck in which is held a piece of metal to be bored, and a twist-drill, together with the improved tool-holder; and Fig. II is a partly-sectional view of the invention on an enlarged scale.

A is an ordinary chuck, screwed on the lathe-spindle B, and C a piece of metal which is to be bored, and to this end is held in the chuck A.

D is a twist-drill, and E the tool-holder, which constitutes the present invention.

F is the fixed center-point of the lathe.

Referring especially to Fig. II, it will be seen that the tool-holder consists of a cylindrical body, *a*, which is bored to fit standard drills and reamers, and provided at the solid end with a conical depression *b*, to receive the fixed center-point F of the lathe. A slot, *c*, into which the flattened end *d* of the drill D enters, extends diametrically through the body *a*, and is adapted to receive a key or drift employed to force out the drill. A handle, *e*, projecting from the side of the body *a*, may be held in the hand of the operator during the drilling operation, and when thus held its tendency to turn with the chuck indicates the amount of work done by the drill.

In the foregoing only one method of using the tool-holder is described; but it will be obvious to mechanics that it has a variety of other uses, among which may be mentioned hand-reaming.

I claim as my invention—

A tool-holder which consists of the body *a*, having the tapering hole to receive the tool, the drift-slot *c*, the conical depression *b*, and the handle *e*, substantially as specified.

JOHN WALKER.

Witnesses:
WM. T. HOWARD,
CHAS. W. ARNOLD.